US007479264B2

(12) United States Patent
Garces et al.

(10) Patent No.: US 7,479,264 B2
(45) Date of Patent: Jan. 20, 2009

(54) SYNTHETIC PLATY MAGADIITE AND OCTASILICATE

(75) Inventors: Juan M. Garces, Midland, MI (US); Steven R. Lakso, Shepherd, MI (US); Brian J. Schoeman, Midland, MI (US)

(73) Assignee: The Dow Chmeical Company, Midland, MI (US)

( * ) Notice: Subject to any disclaimer, the term of this patent is extended or adjusted under 35 U.S.C. 154(b) by 576 days.

(21) Appl. No.: 11/338,553

(22) Filed: Jan. 24, 2006

(65) Prior Publication Data

US 2006/0127297 A1    Jun. 15, 2006

Related U.S. Application Data

(62) Division of application No. 10/257,487, filed as application No. PCT/US01/11978 on Apr. 12, 2001, now Pat. No. 7,063,825.

(51) Int. Cl.
*C01B 33/32* (2006.01)
*C01B 33/143* (2006.01)
*C01B 33/152* (2006.01)
*C01B 33/154* (2006.01)

(52) U.S. Cl. .................. 423/332; 423/333; 423/335; 423/338

(58) Field of Classification Search .................. 423/332, 423/333, 335, 338
See application file for complete search history.

(56) References Cited

U.S. PATENT DOCUMENTS

| 4,582,693 | A | 4/1986 | Desmond et al. | |
|---|---|---|---|---|
| 4,626,421 | A | 12/1986 | Zones | |
| 4,806,327 | A | 2/1989 | Rieck et al. | |
| 4,859,648 | A | 8/1989 | Landis et al. | |
| 5,236,681 | A | 8/1993 | Chu et al. | |
| 5,236,882 | A | 8/1993 | Shih et al. | |
| 5,427,758 | A | 6/1995 | Bauer | |
| 5,717,000 | A | 2/1998 | Karande et al. | |
| 6,703,501 | B1 | 3/2004 | Kim et al. | |
| 7,109,257 | B2* | 9/2006 | Lorah et al. | 523/216 |
| 2006/0142460 | A1* | 6/2006 | Cogen et al. | 524/445 |
| 2006/0241232 | A1* | 10/2006 | Garces et al. | 524/444 |
| 2007/0161734 | A1* | 7/2007 | Fudemoto et al. | 524/445 |

FOREIGN PATENT DOCUMENTS

| CA | 587742 | 11/1959 |
|---|---|---|
| DE | 220 585 | 1/1884 |
| DE | 221 723 | 9/1984 |

OTHER PUBLICATIONS

Garces, et al., "Hypothetical Structures of Magadiite and Sodium Octosilicate and Structural Relationships Between the Layered Alkali Metal Silicates and the Mordenite- and Pentasil-Group Zeolites," *Clays and Clay Minerals*, vol. 36, No. 5, 1988, 409-418.
Lagaly et al., "Magadiite and H-Magadiite: I. Sodium Magadiite and Some of Its Derivatives," *American Mineralogist*, vol. 60, 1975, pp. 642-649.
McCulloch, "A New Highly Silicous Soda-Silica Compound," *J. Am. Chem. Soc.*, vol. 74, 1952, pp. 2453-2456.
John W. Anthony et al., *Handbook of Mineralogy*, vol. 2, 1995, p. 491.
R. K. Iler, "Ion Exchange Properties of a Crystalline Hydrated Silica", *Journal of Colloid Science*, vol. 19, pp. 648-657. (1964).
Kimiharu Endo et al., "FOrmation of Intercalation Compounds of a Layered Sodium Octosilicate with n-Alkyltrimethylammonium Ions and the Application to Organic Derivatization", *Bull. Chem. Soc. Jpn.*, vol. 67, No. 12, pp. 3352-3355, (1994).

* cited by examiner

*Primary Examiner*—David M Brunsman

(57) ABSTRACT

A method for producing synthetic magadiite, including the step of: heating a liquid aqueous colloidal silica suspension, the liquid aqueous colloidal silica suspension having a mole ratio of sodium hydroxide to silica and a mole ratio of water to silica effective to produce a synthetic magadiite wherein more than fifty percent by weight of the synthetic magadiite is platy synthetic magadiite. The synthetic platy magadiite can be converted to the acid form and: (a) heated to produce quartz-like plates; or Coalkylated to produce an organophilic material. In another aspect the instant invention is a method for the production of platy sodium octasilicate which includes the step of: heating a liquid aqueous colloidal silica dispersion containing silica, sodium oxide, and water, the mole ratio of the silica to the sodium oxide being in the range of from about 3.5 to about 10. In another aspect, the instant invention is a method for preparing a liquid aqueous colloidal silica dispersion, the dispersion having a mole ratio of silica to sodium oxide of from 3.5 to 10, which includes the step of: mixing a sufficient amount of liquid aqueous colloidal silica suspension with a liquid aqueous sodium silicate suspension to produce the liquid aqueous colloidal silica dispersion, the liquid aqueous colloidal silica suspension having a mole ratio of silica to sodium oxide of more than 20, the liquid aqueous sodium silicate suspension having a mole ratio of silica to sodium oxide of less than 3.5, the rate of mixing being effective to prevent the gelation or solidification of the liquid aqueous colloidal silica dispersion.

11 Claims, 5 Drawing Sheets

SYNTHETIC PLATY MAGADIITE AND OCTASILICATE

CROSS-REFERENCE TO RELATED APPLICATION

This application is a divisional of application Ser. No. 10/257,487 filed Jan. 14, 2003, now U.S. Pat. No. 7,063,825, which is a 371 of PCT/US01/11978 filed Apr. 12, 2001.

GOVERNMENT CONTACT

This application is under a Government contract with The Department of Commerce (NIST)—Advanced Technology Program Project #70NANB7H3028.

The instant invention is in the field of layered hydrated crystalline polysilicates. More specifically, the instant invention relates to magadiite and octasilicate layered hydrated crystalline polysilicates.

Makatite ($Na_2O.4SiO_2.5H_2O$), kanemite ($Na_2O.4SiO_2.7H_2O$), octasilicate ($Na_2O.8SiO_2.9H_2O$), magadiite ($Na_2O.14SiO_2.10H_2O$) and kenyaite ($Na_2O.22SiO_2.10H_2O$) are a series of sodium polysilicate hydrates, Almond et al., "A structural consideration of kanemite, octasilicate, magadiite and kenyaite". Makatite, kanemite, octasilicate, magadiite and kenyaite are useful, for example, in the preparation of materials for catalysis.

Magadiite was first discovered as a natural material and then synthesized in the laboratory. Natural magadiite tends to be in the form of several nanometer thick square plates that are several micrometers on a side. However, synthetic magadiite tends to be in the form of spherical cabbage-like aggregates about ten micrometers in diameter, Garces, et. al., Clays and Clay Minerals, 1988, 409-418. Synthetic magadiite can prepared hydrothermally by heating a colloidal silica suspension characterized as 9 moles of $SiO_2$, 2 moles of NaOH and 75 moles of water at 100 degrees Celsius for 4 weeks, Lagaly et al., Am. Mineral. 1975, 642.

The "aspect ratio" (plate length/plate thickness) of magadiite in the form of individual plates is relatively high (100 or more). The aspect ratio of magadiite in the form of cabbage-like aggregates is relatively low (about 1).

Fillers dispersed in a polymer are well known to improve some of the physical properties of the polymer such as the tensile and flex modulus of the polymer. When at least one dimension of the filler is less than one micron and when the aspect ratio of the filler is relatively high, then the improvement can be especially beneficial, that is, "nanocomposite polymer systems", for example, U.S. Pat. No. 5,717,000. Therefore, natural magadiite would be expected to be useful to prepare a nanocomposite polymer system. However, natural magadiite is relatively expensive for such an application. Synthetic magadiite is expected to be less expensive but its low aspect ratio would not allow its use to make a nanocomposite polymer. It would be an advance in the art if a synthetic magadiite could be prepared in the form of separate plates rather than as cabbage-like agglomerates.

Octasilicate tends to be in the form of several nanometer thick plates, which are several microns on a side. Therefore, octasilicate is an excellent candidate to be used as a filler in a nanocomposite polymer system. However, octasilicate is synthesized by a solid state reaction taking 3-4 weeks, McCulloch, J. Am. Chem. Soc., 1952, 2453. It would be an advance in the art if a faster liquid phase method for preparing octasilicate could be developed.

The instant invention, in one embodiment, is a method for producing synthetic magadiite, comprising the step of: heating a liquid aqueous colloidal silica suspension, the liquid aqueous colloidal silica suspension having a mole ratio of sodium hydroxide to silica and a mole ratio of water to silica effective to produce a synthetic magadiite wherein more than fifty percent by weight of the synthetic magadiite is platy synthetic magadiite.

In another embodiment, the instant invention is synthetic magadiite wherein more than fifty percent by weight of the synthetic magadiite is in the form of individual plates.

In another embodiment, the instant invention is a silica gel made by contacting the synthetic platy magadiite with an acid in an aqueous liquid.

In another embodiment, the instant invention is synthetic platy magadiite wherein at least a portion of the sodium ions of the synthetic platy magadiite are exchanged for hydrogen ions to produce acidified synthetic platy magadiite.

In another embodiment, the instant invention is the acidified synthetic platy magadiite sufficiently heated to drive off water from the acidified synthetic platy magadiite to form silica plates.

In another embodiment, the instant invention is the acidified synthetic platy magadiite wherein the surface hydroxyls of the acidified synthetic platy magadiite are alkylated.

In another embodiment, the instant invention is a method for the production of platy sodium octasilicate, comprising the step of: heating a liquid aqueous colloidal silica dispersion containing silica, sodium oxide, and water, the mole ratio of the silica to the sodium oxide being in the range of from about 3.5 to about 10.

In another embodiment, the instant invention is a method for preparing a liquid aqueous colloidal silica dispersion, the dispersion having a mole ratio of silica to sodium oxide of from 3.5 to 10, comprising the step of: mixing a sufficient amount of liquid aqueous colloidal silica suspension with a liquid aqueous sodium silicate suspension to produce the liquid aqueous colloidal silica dispersion, the liquid aqueous colloidal silica suspension having a mole ratio of silica to sodium oxide of more than 20, the liquid aqueous sodium silicate suspension having a mole ratio of silica to sodium oxide of less than 3.5, the rate of mixing being effective to prevent the gellation or solidification of the liquid aqueous colloidal silica dispersion.

DETAILED DESCRIPTION OF THE INVENTION

Figure 1:
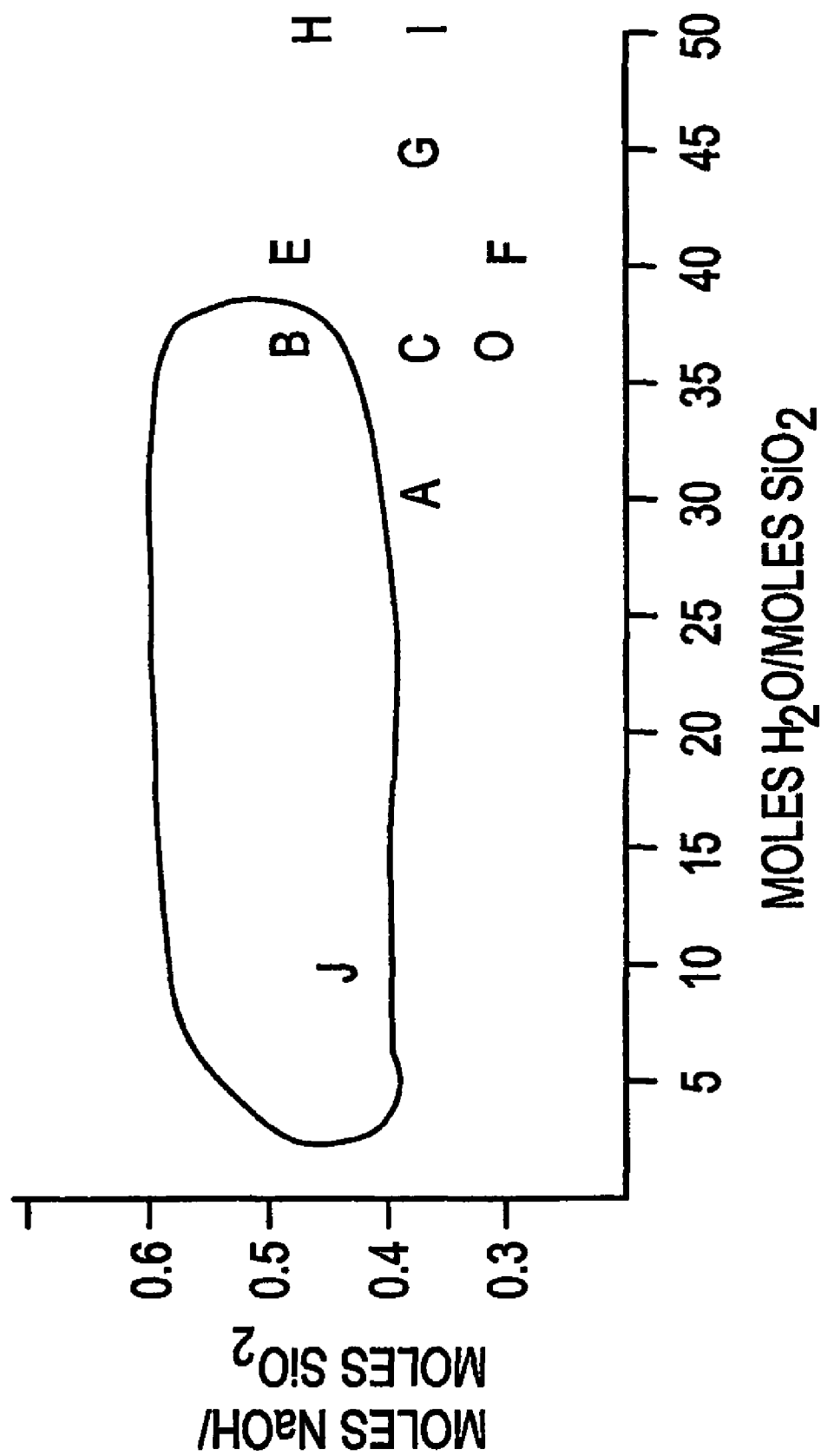
FIG. 1 is a plot of moles of $NaOH/SiO_2$ v. Moles of $H_2O/SiO_2$ showing various results within and outside of the instant invention.
Figure 2:
FIG. 2 is a photomicrograph of platy synthetic magadiite of the instant invention.
Figure 3:
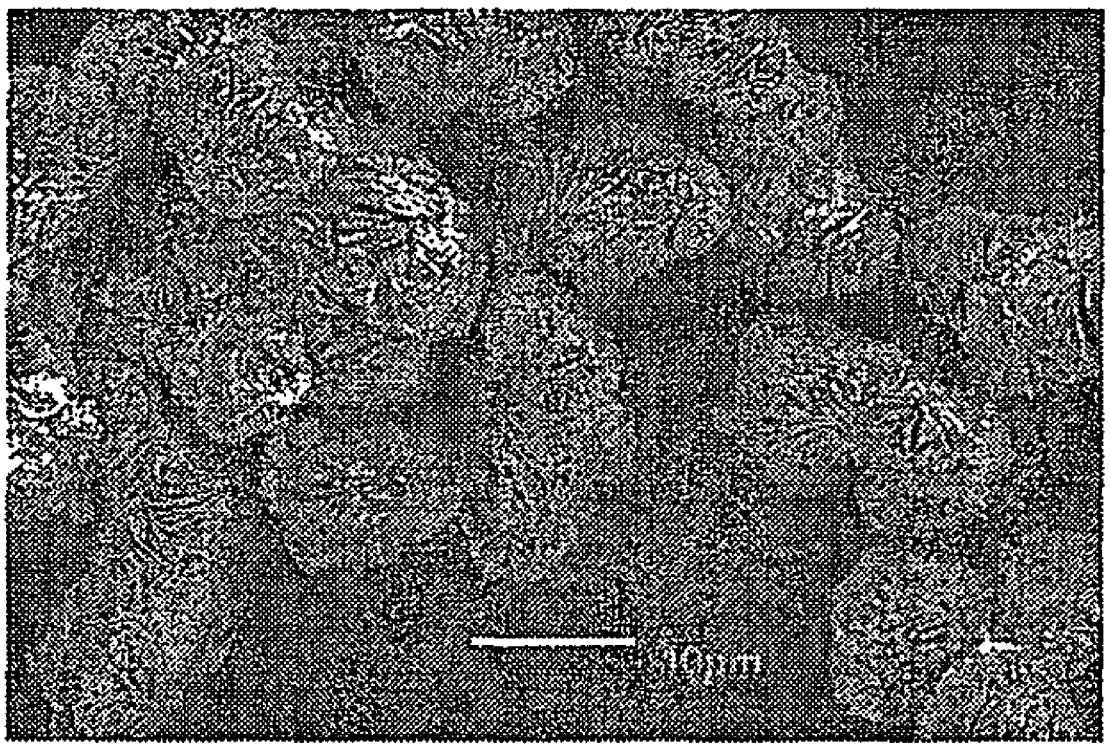
FIG. 3 is is a photomicrograph of synthetic magadiite of the prior art showing the cabbage-like agglomerates associated therewith.

Referring now to FIG. 1, therein is shown a plot of moles of $NaOH/SiO_2$ v. moles of $H_2O/SiO_2$ showing various results A-F within and outside of the instant invention. Each colloidal silica suspension described in FIG. 1 is heated to 160 degrees Celsius for 24 hours to produce synthetic magadiite, which is then examined by electron microscopy. The result for A is more single plates than cabbage-like agglomerates on a weight basis. The result for B is essentially all single plates shown in FIG. 2. The result for C is essentially all cabbage-like agglomerates shown in FIG. 3. The result for D is mostly amorphous silica. The result for E is mostly cabbage-like agglomerates with some plates on a weight basis. The result for F is mostly cabbage-like agglomerates. The result for G is cabbage-like agglomerates. The result for H is cabbage-like agglomerates. The result for I is mostly cabbage-like agglomerates with a some plates on a weight basis. The result for J is essentially all plates. The oval drawn on FIG. 1 shows the preferred range of the mole ratio of sodium hydroxide to silica and water to silica of the instant invention. The most preferred range of the mole ratio of sodium hydroxide to silica and water to silica of the instant invention would be a smaller oval inside the oval shown in FIG. 1. In the broad scope of the instant invention, the mole ratio of sodium hydroxide to silica and a mole ratio of water to silica must be effective to produce a synthetic magadiite wherein more than fifty percent by weight of the synthetic magadiite is platy synthetic magadiite.

The temperature used is preferably from about 140 degrees to about 170 degrees. At temperatures above 170 degrees, for example, 180 degrees or 190 degrees or 200 degrees Celsius, the yield of platy synthetic magadiite is progressively lower. At temperatures below 140 degrees Celsius, for example, 130 degrees, 120 degrees or 110 degrees Celsius, the rate of formation of platy synthetic magadiite is progressively slower. However, adding magadiite seed, for example, at the 10 weight percent level, to the aqueous colloidal silica suspension reduces the time needed at 160 degrees Celsius to 8 hours or less.

The synthetic magadiite produced is more than fifty percent by weight in the form of individual plates v. the cabbage-like agglomerates. More preferably, the synthetic magadiite produced is more than eighty percent by weight in the form of individual plates v. the cabbage-like agglomerates. Most preferably, the synthetic magadiite produced is more than ninety percent by weight in the form of individual plates v. the cabbage-like agglomerates and contains less than two percent by weight of amorphous silica.

When the platy magadiite of the instant invention is contacted with an acid in an aqueous suspension, then a new form of silica gel is produced (having a network of plates). Similarly, when the platy magadiite of the instant invention is contacted with colloidal silica and an acid in an aqueous suspension, then another new form of silica gel is produced (having a network of plates and spheres).

At least a portion of the sodium ions of the synthetic platy magadiite of the instant invention can be exchanged for hydrogen ions to produce acidified synthetic platy magadiite. When the portion of the sodium ions of the synthetic platy magadiite of the instant invention is ninety percent or more and such acidified synthetic platy magadiite (or perhaps more accurately platy silica) is heated sufficiently to drive off water, then the acidified synthetic platy magadiite is converted into quartz-like silica plates. On the other hand, the acidified synthetic platy magadiite can also be alkylated via the Si—O—H moiety to produce Si—O—R, where the R group is an alkyl group, for example, butyl. Such alkylated materials are lipophylic and as such are more compatible with many polymers. A fraction of $B_2O_4$ can be substituted for the $SiO_2$ so that the boron-substituted platy synthetic magadiite can be treated with sodium aluminate to produce an aluminated platy synthetic magadiite to be used, for example, as a catalyst activator.

Figure 4:
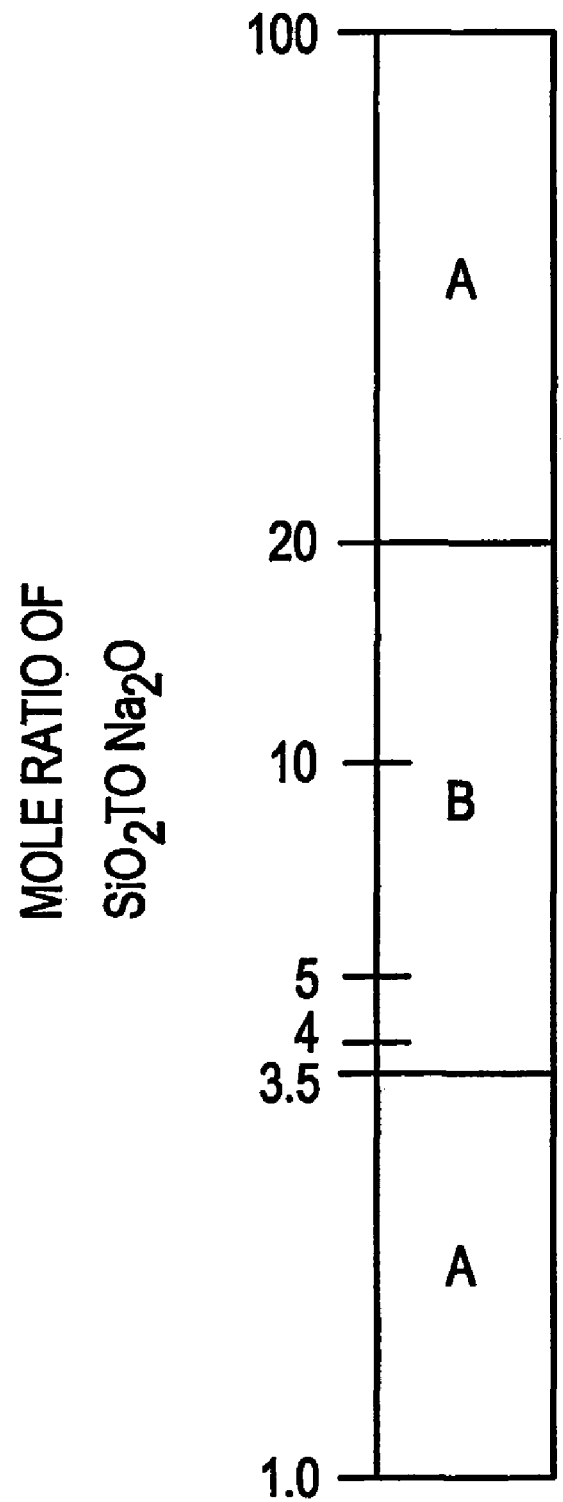
FIG. 4 is graph showing mole ratio of $SiO_2$ to $Na_2O$ for various aqueous colloidal silica systems.

Referring now to FIG. 4, therein is a graph showing mole ratio of $SiO_2$ to $Na_2O$ for various aqueous colloidal silica systems. Such systems tend to be stable and liquid in the "A" regions. However, such systems tend to unstable and not liquid in the "B" region. In the "B" region, the system tends to gel and form a solid.

The instant invention, in one of its embodiments, is a solution to this problem. Using the instant invention a liquid aqueous colloidal silica dispersion having a mole ratio of silica to sodium oxide of from 3.5 to 10 can be prepared by first preferably cooling a liquid aqueous sodium silicate suspension to less than ten degrees Celsius, the liquid aqueous sodium silicate suspension having a mole ratio of silica to sodium oxide of less than 3.5 and then mixing a sufficient amount of liquid aqueous colloidal silica suspension to the cooled liquid aqueous sodium silicate suspension to produce the liquid aqueous colloidal silica dispersion, the liquid aqueous colloidal silica suspension having a mole ratio of silica to sodium oxide of more than 20, the rate of mixing being effective to prevent the gellation or solidification of the liquid aqueous sodium silicate suspension. It should be understood that although not preferred, substituting an acid for the liquid aqueous colloidal silica suspension in the above procedure is equivalent in the instant invention. Similarly, it should be understood that although not preferred, substituting a base for the liquid aqueous sodium silicate suspension is equivalent in the instant invention.

Figure 5:
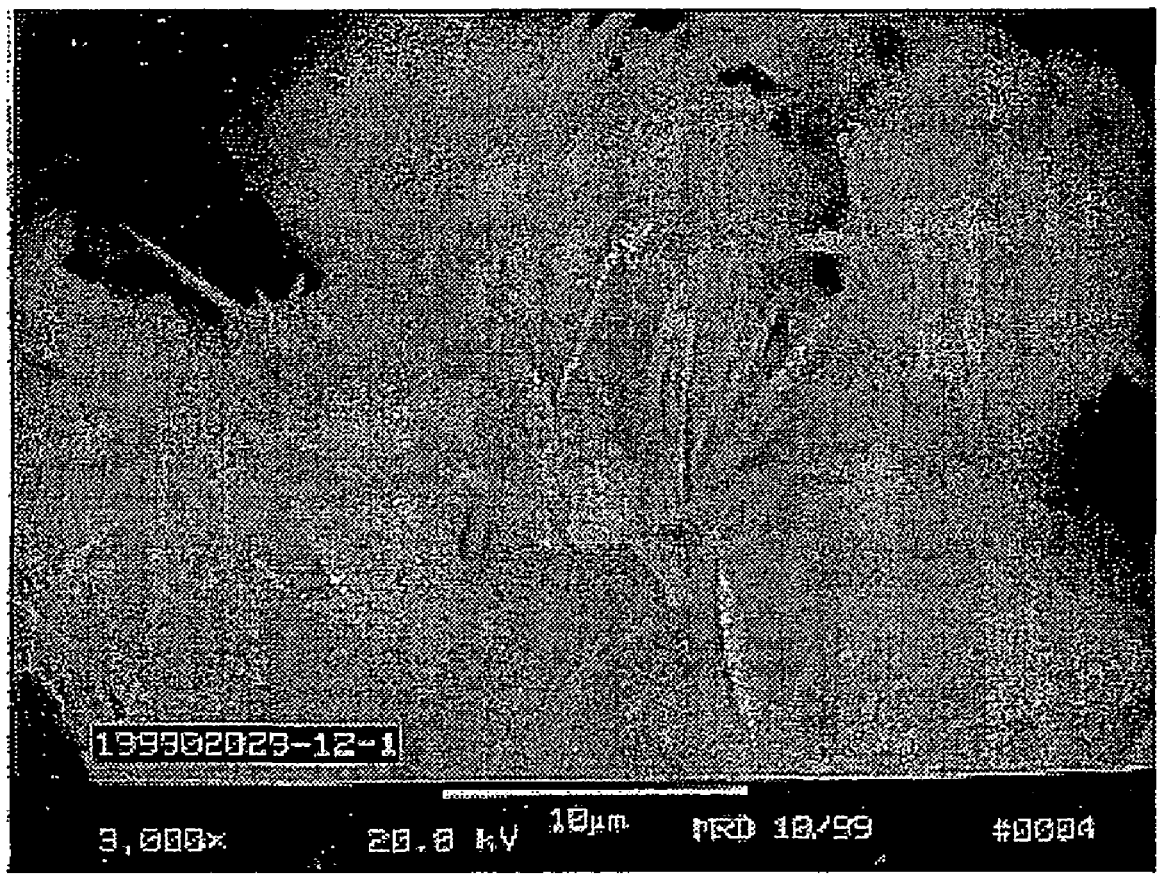
FIG. 5 is a photomicrograph of platy synthetic octasilicate made by the method of the instant invention.

For example, 78.45 grams of sodium silicate (PQ Corp., PQ-N, 28.2 wt % $SiO_2$, 8.7 wt % $Na_2O$) is cooled to a temperature below 5° C. in a sonicator bath containing ice and water with stirring and no sonication. The sonicator is then started and 21.7 g colloidal silica (Ludox HS-40, dupont, approx. 40 wt % $SiO_2$, trace amounts of $Na_2O$) is gradually added drop-wise to the heel of sodium silicate while continually stirring in a vigorous manner. The rate of addition is such that little visible solid amorphous precipitate is formed. During the course of addition, the bath is kept cool by the ice. Then the resulting liquid aqueous colloidal silica dispersion having a mole ratio of silica to sodium oxide of about 4.6 is heated at 105 degrees Celsius for 10 days to produce the octasilicate shown in FIG. 5. Adding octasilicate seed to the liquid aqueous colloidal silica dispersion at the 0.8 weight percent level reduces the time needed to 3 days (and one day if the liquid aqueous colloidal silica dispersion is agitated).

The temperature used to heat the liquid aqueous colloidal silica dispersion preferably is in the range of from 50 to 170 degrees Celsius. At temperatures progressively lower than about 100-110 degrees Celsius, the time needed is increased. At progressively higher temperatures, such as 125 degrees Celsius or 155 degrees Celsius, the octasilicate tends to redissolve and form magadiite and kenyaite at a progressively higher rate.

The mole ratio of the silica to the sodium oxide in the liquid aqueous colloidal silica dispersion is preferably in the range of from 4 to about 10, more preferably in the range of from about 4 to about 6, yet more preferably in the range of from about 4.3 to about 5.2 and most preferably in the range of from about 4.5 to about 4.7. A fraction of $B_2O_4$ can be substituted for the $SiO_2$ in the liquid aqueous colloidal silica dispersion so that the boron-substituted octasilicate can be treated with sodium aluminate to produce an aluminated octasilicate and used, for example, as a catalyst activator.

What is claimed is:

1. Silica gel made by contacting a synthetic platy magadiite with an acid in an aqueous liquid wherein more than fifty percent by weight of the synthetic magadiite is platy magadiite in the form of individual plates.

2. Silica gel made by contacting a synthetic platy magadiite with colloidal silica and an acid in an aqueous liquid wherein more than fifty percent by weight of the synthetic magadiite is platy magadiite in the form of individual plates.

3. A method for the production of platy sodium octasilicate, comprising the step of: heating a liquid aqueous colloidal silica dispersion containing silica, sodium oxide, and water, the mole ratio of the silica to the sodium oxide being in the range of from about 3.5 to about 10.

4. The method of claim 3, wherein the temperature is in the range of from about 80 to about 125 degrees Celsius and the mole ratio of the silica to the sodium oxide is in the range of from about 4 to about 6.

5. The method of claim 3, wherein the temperature is in the range of from about 95 to about 115 degrees Celsius and the mole ratio of the silica to the sodium oxide is in the range of from about 4.3 to about 5.2.

6. The method of claim 3, wherein the temperature is in the range of from about 100 to about 110 degrees Celsius and the mole ratio of the silica to the sodium oxide is in the range of from about 4.5 to about 4.7.

7. A method for preparing a liquid aqueous colloidal silica dispersion, the dispersion having a mole ratio of silica to sodium oxide of from 3.5 to 10, comprising the step of: mixing a sufficient amount of liquid aqueous colloidal silica suspension with a liquid aqueous sodium silicate suspension to produce the liquid aqueous colloidal silica dispersion, the liquid aqueous colloidal silica suspension having a mole ratio of silica to sodium oxide of more than 20, the liquid aqueous sodium silicate suspension having a mole ratio of silica to sodium oxide of less than 3.5, the rate of mixing being effective to prevent the gellation or solidification of the liquid aqueous colloidial silica dispersion.

8. The method of claim 7, wherein the liquid aqueous colloidal silica dispersion has a mole ratio of silica to sodium oxide of from 4 to 10.

9. The method of claim 7, wherein the liquid aqueous colloidal silica dispersion has a mole ratio of silica to sodium oxide of from 4 to 6.

10. The method of claim 7, wherein the liquid aqueous colloidal silica dispersion has a mole ratio of silica to sodium oxide of from 4.5 to 5.2.

11. The method of claim 7, wherein the liquid aqueous colloidal silica dispersion has a mole ratio of silica to sodium oxide of from 4.5 to 4.7.

* * * * *